Dec. 28, 1965                J. H. McCULLEY                3,225,731
                              BOAT FENDER
                           Filed Oct. 19, 1964

INVENTOR.
JAMES H. McCULLEY
BY
ATTORNEYS

United States Patent Office 3,225,731
Patented Dec. 28, 1965

3,225,731
BOAT FENDER
James H. McCulley, Akron, Ohio, assignor to The Johnson Rubber Co., Middlefield, Ohio, a corporation of Ohio
Filed Oct. 19, 1964, Ser. No. 404,752
5 Claims. (Cl. 114—219)

This invention relates generally to fender devices and more particularly to a novel and improved combination elastomeric fender element and means for mounting the fender element.

A fender device incorporating this invention is illustrated on the hull of a vessel. However, it should be understood that it could be used in other locations, such as on wharfs, truck docks and vehicles. The structure is arranged so that the fender device may be easily mounted and is capable of withstanding extremely heavy impacts without damage. The mounting structure is arranged to provide very high strength, is protected against damage and also against any substantial exposure to the weather. The structure is easily installed or removed from its support.

It is an important object of this invention to provide a novel and improved fender device including an elastomeric fender element and a mounting structure suitable for use on ships, wharfs, truck docks and vehicles.

It is another important object of this invention to provide a novel and improved rubber fender in combination with a mounting structure therefor wherein the fender device is supported and strengthened throughout its length by the mounting structure and wherein the mounting structure is protected against damage and weathering.

It is still another important object of this invention to provide a novel and improved fender device and mounting structure which is easily installed on vessels, wharfs, truck docks, vehicles and the like, and which may be removed or replaced without difficulty.

It is still another object of this invention to provide a novel and improved fender including a generally D shaped rubber like fender element to absorb impacts in combination with a mounting plate positioned internally of the fender element threaded at spaced points therealong to receive mounting studs.

It is still another object of this invention to provide a novel and improved fender device including a D shaped rubber element having substantially imperforate exposed surfaces, a mounting plate extending internally along the rubber element and longitudinally spaced studs threaded into the plate for purposes of mounting the fender device.

Further objects and advantages will appear from the following description and drawings wherein.

Figure 1:
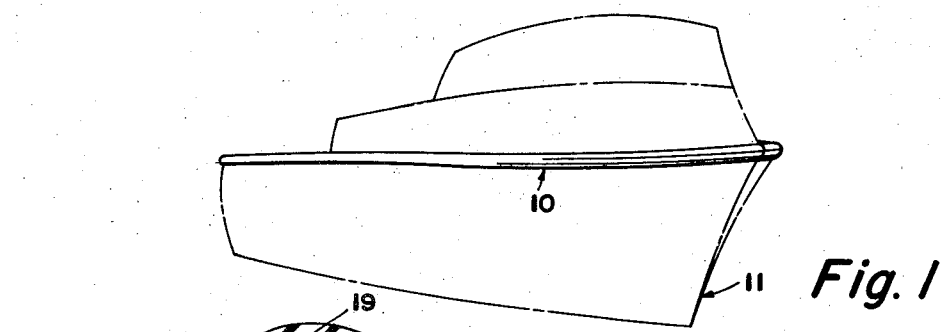
FIGURE 1 is a phantom perspective view of a typical vessel with a fender device incorporating this invention mounted thereon.

A fender device incorporating this invention is illustrated in FIGURE 1 as it might be applied to the hull of a vessel. In such instance the fender device 10 is fastened to the hull and extends around its periphery to provide an impact surface which protects the hull itself against damage when the vessel encounters pilings, piers, or other objects. If desired, additional pieces of the fender device 10 may also be located along other portions of the hull structure both horizontally or vertically to provide additional protection against hull damage.

In FIGURE 1 the hull 11 is illustrated in phantom merely to show one use of the fender device. It should be understood that a fender device, according to this invention, could also be used on truck docks, land vehicles and any other structure such as piers or the like to prevent damage from occurring when any type of impact occurs.

Figure 2:
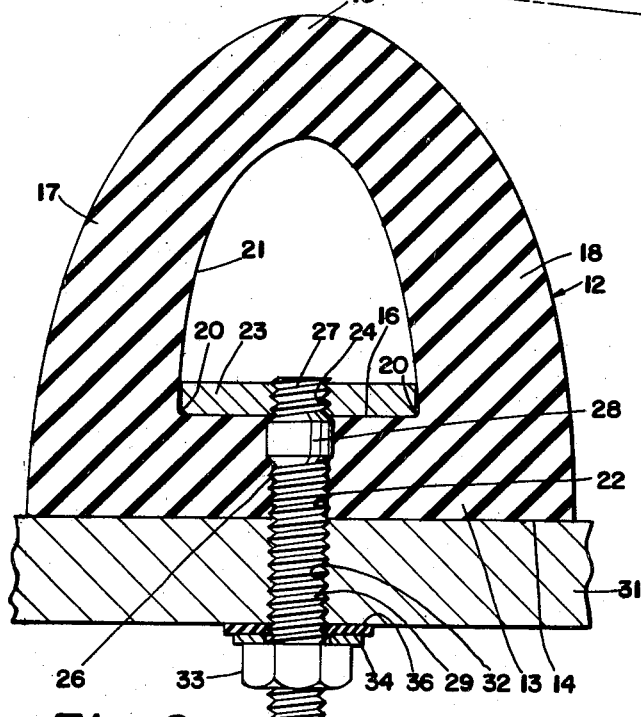
FIGURE 2 is a cross-section of the fender device illustrated mounted on the hull of a vessel of the type illustrated in FIGURE 1; and, FIGURE 3 is a side elevation partially in longitudinal section.
Figure 3:
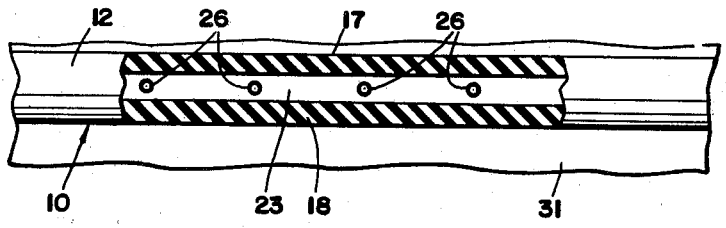

Referring now to FIGURES 2 and 3, one preferred form of this invention includes an elongated bumper element 12 having a generally D shaped cross-section. Preferably, the bumper element 12 is formed by extrusion and is made of a tough natural or synthetic rubber material.

The bumper element includes a base wall 13 having an outer surface 14 and an inner surface 16. A pair of similar and opposed imperforate curved side walls 17 and 18 extend laterally from one side of the opposite extremities of the base wall 13 and are joined at 19 a point spaced from the base wall 13. The base wall 13 and the two side walls 17 and 18 cooperate to form a substantially "D" shaped section having walls which are substantially uniform in thickness and which cooperate to define a longitudinal passage 21 extending the length of the bumper element. Fillets 20 are formed at the corners of the passage to eliminate stress concentrations.

In order to mount the bumper element 12 on the hull the bumper element is formed with longitudinally spaced apertures 22 which are cut through the base wall from the outer surface 14 to the inner surface 16. A plate 23 is positioned within the passage 21 adjacent to the inner surface 16 by simply pushing the plate into the end of the piece of bumper element. Preferably, the plate 23 extends the full length of the bumper element 12 and has a rectangular cross-section with a width substantially equal to the width of the passage 21 adjacent the base wall 13. The plate 23 is formed with longitudinally spaced threaded openings 24 aligned with the apertures 22 in the bumper element. A threaded stud 26 extends through each aperture 22 and is threaded into the adjacent opening 24 in the plate 23. The stud is preferably formed with a short threaded section 27 at one end, an unthreaded section 28 and a longer threaded section 29. Preferably, the short threaded section 27 has a length only slightly longer than the thickness of the plate 23 so that it does not protrude any substantial distance beyond the face of the plate 23 when the stud 26 is threaded into the opening 24 until the unthreaded section 28 engages the inner side of the plate 23. The unthreaded section 28 engages the beginning of the threads in the opening 24 and locks the stud 26 in the installed position illustrated.

The threaded section 29 is sufficiently long to extend beyond the outer surface 14 of the base wall 13 and through the hull 31 of the vessel or the wall of any other device on which the fender device is to be mounted. To install the fender device it is merely necessary to cut holes 32 in the hull wall 31 at the proper spacing so that the studs 26 extend through the holes 32 when the fender device is properly mounted. The completion of mounting the fender device is accomplished by placing nuts 33 on the inner ends of the studs 26 and tightening them against the inside of the hull 31. Suitable thrust washers 34 and gasket washers 36 may be placed on the stud under the nut 33. The gasket washer 36 should be formed of a material which deforms into tight engagement with the threads and provides a watertight joint between the hull 31 and the stud 26. If the fender device is mounted a substantial distance from the waterline of the vessel the gasket washers 36 need not be used since the tightening of the nut 33 tends to deform the material of the base wall 13 into engagement with the stud 26 and the outer surface of the hull 31 to form a watertight joint around the hole 32. Since the walls 17 and 18 are imperforate water cannot enter the passage 21 excepting at the end and therefore significant amounts of water from spray or the like do not enter the passage 21.

Preferably, the plate 23 is formed of aluminum or other suitable metal and if desired may be coated with a protective surface to minimize corrosion. However, in most instances water will not enter the passage 21 to any significant degree and corrosion is not a problem.

Because the bumper element 12 is formed of walls 17 and 18 which are imperforate and the base wall 13 is supported on both sides adjacent to the openings 22 a very strong device is provided which can absorb extremely high impact loads without damage. Also, the curved form of the bumper element with the central passage 21 permits deflection of the side walls 17 and 18 under impact loading while absorbing substantial amounts of energy to cushion the impact force. Preferably, the studs 26 are located at about 12 inch intervals along the entire length of the fender device and provide secure mounting of the entire length of the device with support provided between the studs by the plate 23.

A fender device incorporating this invention provides a high degree of impact resistance, a substantial amount of energy absorption capacity and low cost since all of the elements are easily formed and easily assembled. Also, the fender device can be easily mounted or removed as required. The plate 23 and the bumper element are deformable to conform to the shape of the hull. However, if sharp corners are required in any installation it is merely necessary to cut the appropriate miters or end faces so that the fender device properly fits at such corners.

Although a preferred embodiment of this invention is illustrated, it is to be understood that varoius modifications and rearrangements of parts may be resorted to without departing from the scope of the invention as defined in the following claims.

What is claimed is:

1. A resilient fender device for protecting a surface against damage comprising an elongated bumper element formed of an elastomeric material, said element including a base wall adapted to seat against said surface and similar but opposite imperforate side walls extending laterally in one direction from opposite edges of said base wall, said side wall curving together and being joined at a point spaced from said base wall whereby said walls all cooperate to form a longitudinal passage in said bumper element, a bar positioned along said passage against the inner surface of said base wall, longitudinally spaced threaded openings in said bar, said base wall being formed with apertures through said base wall aligned with said threaded openings in said bar, threaded studs extending through said base wall apertures and threaded into said threaded openings, means locking said studs against movement relative to said bar, said studs extending laterally from said bumper element beyond said base wall and being adapted to receive mounting nuts.

2. A resilient fender device for protecting a surface against damage comprising an elongated D shaped bumper element formed of an elastomeric material, said element including a base wall adapted to seat against said surface and similar but opposite imperforate side walls extending laterally in one direction from opposite edges of said base wall, said side walls curving together and being joined at a point spaced from said base wall whereby said walls all cooperate to form a longitudinal passage in said bumper element, a rectangular cross-section bar having a width substantially equal to the width of said opening adjacent said base wall positioned along said passage against the inner surface of said base wall, longitudinally spaced threaded openings in said bar, said base wall being formed with apertures through said base wall aligned with said threaded openings in said bar, threaded studs extending through said base wall apertures and threaded into said threaded openings, means locking said studs against rotation relative to said bar, said studs extending laterally from said bumper element beyond said base wall.

3. A resilient fender device for protecting a surface against damage comprising an elongated D shaped bumper element formed of an elastomeric material, said element including a base wall adapted to seat against said surface and similar but opposite imperforate side walls extending laterally in one direction from opposite edges of said base wall, said side walls curving together and being joined at a point spaced from said base wall whereby said walls all cooperate to form a longitudinal opening in said bumper element, a rectangular cross-section metallic bar having a width substantially equal to the width of said opening adjacent said base wall positioned along said opening against the inner surface of said base wall, longitudinally spaced threaded openings in said bar, said base wall being formed with apertures aligned with said threaded openings in said bar, threaded studs extending through said apertures and threaded into said threaded openings, said studs being formed with an unthreaded portion closely fitting said apertures and engaging the threads in said opening locking said studs against rotation relative to said bar, said studs extending laterally from said bumper element beyond said base wall.

4. In combination a vessel having a hull, an elongated D shaped bumper element formed of an elastomeric material, said element including a base wall seated against the surface of said hull and similar but opposite side walls extending laterally away from said hull along opposite edges of said base wall, said side walls curving together and being joined at a point spaced from said base wall whereby said walls all cooperate to form a longitudinal opening in said bumper element having a cross-sectional shape substantially similar to the cross-sectional shape of the periphery of said bumper elements, a metallic bar positioned along said opening against the inner surface of said base wall, longitudinally spaced threaded openings in said bar, said base wall being formed with apertures aligned with said threaded openings in said bar, threaded studs extending through said apertures and threaded into said threaded openings, an unthreaded portion on said studs closely fitting said apertures and locking with the threads of said openings, said studs extending laterally from said bumper element through said hull, and nuts on said studs against the side of said hull remote from said bumper element.

5. A resilient fender device for protecting a surface against damage comprising an elongated bumper element formed of an elastomeric material, said element including a base wall adapted to seat against said surface and similar but opposite side walls extending laterally in one direction from opposite edges of said base wall, said side walls curving together and being joined at a point spaced from said base wall whereby said walls all cooperate to form a longitudinal opening in said bumper element, said walls having a substantially uniform thickness, a metallic bar having a rectangular cross-section and a width substantially equal to the width of said opening adjacent said base wall positioned along said opening against the inner surface of said base wall, longitudinally spaced threaded openings in said bar, said base wall being formed with apertures aligned with said threaded openings in said bar, threaded studs extending through said apertures and threaded into said threaded openings, said stud being formed with means to lock with the threads of said threaded openings and terminating at a location substantially adjacent to the side of said bar remote from said base wall.

References Cited by the Examiner

UNITED STATES PATENTS

| | | | |
|---|---|---|---|
| 1,679,782 | 8/1928 | Postel | 293—71 |
| 2,624,596 | 1/1953 | Clingman | 293—71 |
| 2,681,246 | 6/1954 | Corydon | 293—71 |
| 2,731,290 | 1/1956 | Corydon | 293—71 |
| 2,959,146 | 11/1960 | Erkert | 114—219 |

MILTON BUCHLER, *Primary Examiner.*

FERGUS S. MIDDLETON, *Examiner.*